(12) United States Patent
Yamauchi

(10) Patent No.: US 12,135,082 B2
(45) Date of Patent: Nov. 5, 2024

(54) VEHICLE PARKING LOCK SYSTEM

(71) Applicant: TSUBAKIMOTO CHAIN CO., Osaka (JP)

(72) Inventor: Masahiko Yamauchi, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/420,878

(22) Filed: Jan. 24, 2024

(65) Prior Publication Data
US 2024/0288069 A1   Aug. 29, 2024

(30) Foreign Application Priority Data
Feb. 28, 2023 (JP) .................................. 2023-029605

(51) Int. Cl.
| | |
|---|---|
| F16H 63/34 | (2006.01) |
| F16H 59/44 | (2006.01) |
| F16H 59/50 | (2006.01) |
| F16H 59/66 | (2006.01) |
| F16H 61/20 | (2006.01) |
| F16H 59/18 | (2006.01) |

(52) U.S. Cl.
CPC ......... *F16H 63/3416* (2013.01); *F16H 59/44* (2013.01); *F16H 59/50* (2013.01); *F16H 59/66* (2013.01); *F16H 61/20* (2013.01); *F16H 59/18* (2013.01); *F16H 2059/443* (2013.01); *F16H 2059/446* (2013.01); *F16H 2059/663* (2013.01); *F16H 2061/205* (2013.01); *F16H 2312/04* (2013.01); *F16H 2312/12* (2013.01)

(58) Field of Classification Search
CPC ................. F16H 63/3416; F16H 59/50; F16H 2059/6823; F16H 59/66; F16H 2059/446
See application file for complete search history.

(56) References Cited

U.S. PATENT DOCUMENTS

| | | | |
|---|---|---|---|
| 2014/0297139 A1* | 10/2014 | Clarke | B60T 1/005 |
| | | | 192/219.5 |
| 2018/0009439 A1* | 1/2018 | Park | B60W 30/18054 |
| 2018/0066748 A1* | 3/2018 | Hu | F16H 61/0213 |
| 2019/0315321 A1* | 10/2019 | Lee | F16H 59/54 |
| 2020/0300359 A1 | 9/2020 | Kamiya et al. | |

FOREIGN PATENT DOCUMENTS

| | | |
|---|---|---|
| JP | 60-94858 A | 5/1985 |
| JP | 2011-126474 A | 6/2011 |
| JP | 2020-153435 A | 9/2020 |
| JP | 2022-49749 A | 3/2022 |
| JP | 2022049749 A * | 3/2022 |

* cited by examiner

*Primary Examiner* — Stacey A Fluhart
(74) *Attorney, Agent, or Firm* — WHDA, LLP

(57) ABSTRACT

An object of the present invention is to provide a vehicle parking lock system that realizes a parking lock with a positive user perception, and enables energy and cost reductions without complex control and with a simple configuration. The object is achieved by a selectable clutch configured to be switchable between four operating modes and provided to one of an input shaft, an output shaft, and an intermediate shaft of a transmission. The operating mode of the selectable clutch is controlled based on detection signals of a plurality of sensors to prevent an unintended movement of the vehicle when the vehicle is stationary.

8 Claims, 9 Drawing Sheets

VEHICLE PARKING LOCK SYSTEM

BACKGROUND OF THE INVENTION

1. Field of the Invention

The present invention relates to a vehicle parking lock system.

2. Description of the Related Art

A currently known vehicle parking lock system engages a pawl (parking pawl) with a parking gear provided to an output shaft to lock the output shaft, stopping it from rotating (see, for example, Japanese Patent Application Publications Nos. 2011-126474, 2020-153435, and S60-094858).

Another known vehicle parking lock system uses a plurality of selectable one-way clutches or two-way clutches each interposed between each of a plurality of transmission gear trains and an input shaft or an output shaft. The shaft is engaged simultaneously with two transmission gear trains having different gear ratios to stop the rotation of the output shaft, i.e., to establish a parking lock (see, for example, Japanese Patent Application Publication No. 2022-049749).

SUMMARY OF THE INVENTION

The parking gear in the conventional vehicle parking lock system that uses a parking pawl needs to rotate until the pawl engages with the gear, causing the vehicle to roll away until the output shaft is locked, when the vehicle is stopped on a slope, for example. When the slope on which the vehicle is parked is an uphill, for example, the vehicle goes backward for a second until the output shaft is locked. This poor user perception of the parking lock was an issue. Moreover, the output shaft being locked while the vehicle is in motion causes a sudden braking force to be applied, because of which the system requires high strength to withstand the impact, resulting in an increase in size and cost.

Some drivers use the drive force of the engine or motor, instead of the foot brake or parking brake, for temporary stops on slopes. Keeping the vehicle at halt using the drive force consumes significant energy, resulting in substantial energy loss and placing a heavy burden on transmission components, gears, the motor, and the power supply device. This required excessive strength and a heat-resistant cooling structure, leading to increased costs.

The conventional hill start assist feature, often referred to as a hill start system, temporarily stops the vehicle using the foot or parking brake. The brake is released at the right moment when the accelerator pedal is depressed to start the vehicle. This system requires extra energy to generate power such as hydraulic pressure or wire tension that is required for the brake. Using an electric motor to generate the power was not suitable for maintaining the vehicle temporarily stopped on a slope, because of the operation time limit required for protecting the motor from overheating. Moreover, to ensure the responsive operation of this system with a positive user perception, a comprehensive control scheme has to be developed, accounting for various factors such as slope incline, load weight, accelerator pedal input, and so on, for which numerous steps were required.

As described above, conventional parking lock systems using a pawl have the following issues: (1) Poor user perception, and an unnecessarily high strength requirement, due to the freewheeling that occurs before the brake works; (2) Extra power required depending on the system for engaging the brake; (3) Expensive development cost for complex control during a hill start; and (4) Unsuitability for fine control and loud operating noise.

The vehicle parking lock system described in Japanese Patent Application Publication No. 2022-049749 uses a selectable clutch that is either a one-way clutch or two-way clutch. These clutches can not independently switch to all four operating modes, which include a two-way lock mode, forward lock mode, reverse lock mode, and two-way free mode. This is why this parking lock system uses two or more selectable clutches to engage a shaft with two gear trains to establish a parking lock as described in Japanese Patent Application Publication No. 2022-049749. The system therefore entails the issues of complex control of the operating modes of a plurality of selectable clutches, and an increased number of components.

The present invention was made in view of the above circumstances. An object of the present invention is to provide a vehicle parking lock system that realizes a parking lock with a positive user perception, and enables energy and cost reductions without complex control and with a simple configuration.

The present invention solves the above problems by providing a selectable clutch including: an input shaft to which a torque is input from a drive source mounted on a vehicle; an output shaft outputting the torque input from the input shaft via a transmission to a drive wheel of the vehicle; and a parking lock mechanism adapted to restrict either a rotation of the input shaft or a rotation of the output shaft. The parking lock mechanism includes a selectable clutch provided to one of the input shaft, the output shaft, and an intermediate shaft in the transmission, a plurality of sensors mounted on the vehicle, and a control unit. The selectable clutch includes a fixed race and a rotating race that are arranged coaxially, and is configured to be switchable between four operating modes including: a two-way lock mode prohibiting rotation of the rotating race relative to the fixed race in both forward and reverse directions; a forward lock mode prohibiting rotation of the rotating race relative to the fixed race in the forward direction; a reverse lock mode prohibiting rotation of the rotating race relative to the fixed race in the reverse direction; and a two-way free mode allowing rotation of the rotating race relative to the fixed race in both forward and reverse directions. The plurality of sensors include: a first sensor that detects whether or not the vehicle is in a drivable state, when the vehicle is stationary; a second sensor that detects whether or not the vehicle continues to be stationary; and a third sensor that detects an inclination of the vehicle. The control unit is adapted to control the operating modes of the selectable clutch based on detection signals of the plurality of sensors to prevent an unintended movement of the vehicle when the vehicle is stationary.

According to the invention set forth in claim 1, the use of a selectable clutch switchable between four operating modes eliminates or reduces backlash. This minimizes the freewheeling of the output shaft that occurs before it is locked. The operating modes of the selectable clutch are switched based on the detection signals of the sensors, which allows for fine control of the parking lock, and enables a smooth start for the stopped vehicle. This realizes a parking lock with a positive user perception, without complex control, and with a simple configuration. The elimination or reduction of the impact caused by applying the lock while the vehicle is in motion allows for a decrease in the required design strength, leading to cost reduction.

Moreover, this system requires no power to maintain the brake, allowing for the control without motor overheating and a reduction in power consumption.

Further, the following additional effects are achieved.

The selectable clutch can be provided to any of the input shaft, the output shaft, and an intermediate shaft in the transmission. This helps streamline the development process by reducing the coordination required between different cooperate divisions responsible for various parts such as brakes and vehicle motion control. The parking lock being applied to only freewheeling wheels can add additional drive force on rough terrain, uphill, or when high-output vehicles experience wheel slippage. The parking lock system operates quietly and can be applied whenever the vehicle comes to a stop. This provides the added benefit of preventing the vehicle from jerking if it is bumped from behind while stopped at a traffic signal, for example.

According to the invention set forth in claim 2 or 3, an unintended movement of the parked vehicle or continuously stopped vehicle is reliably prevented.

According to the invention set forth in claim 4, the parking lock can be disengaged smoothly, allowing for a smooth start for the stopped vehicle.

According to the invention set forth in claim 5 or 6, the rotating direction of the clutch, when applying a parking lock in one direction, is reversed. This way, whether the vehicle is started to move forward on an uphill or backward on a downhill, the vehicle is prevented from rolling down. This reliably prevents an unintended movement of the vehicle and allows for a smooth start for the stopped vehicle.

According to the invention set forth in claim 7, the parking lock is disengaged automatically when a driving torque is input to move the vehicle that is stopped on a slope. This obviates the need of special control for timely brake release, which would be required in systems that use a parking pawl, hydraulic foot brake, or parking brake. The control system can therefore be simplified, which leads to reduced development cost.

According to the invention set forth in claim 8, the system can be optimally designed by adjusting the number of engaging elements or changing their shape to match the required brake torque, which will help realize an effective parking lock.

DESCRIPTION OF THE PREFERRED EMBODIMENTS

A vehicle parking lock system according to the present invention will be hereinafter described with reference to the drawings.

Figure 1:
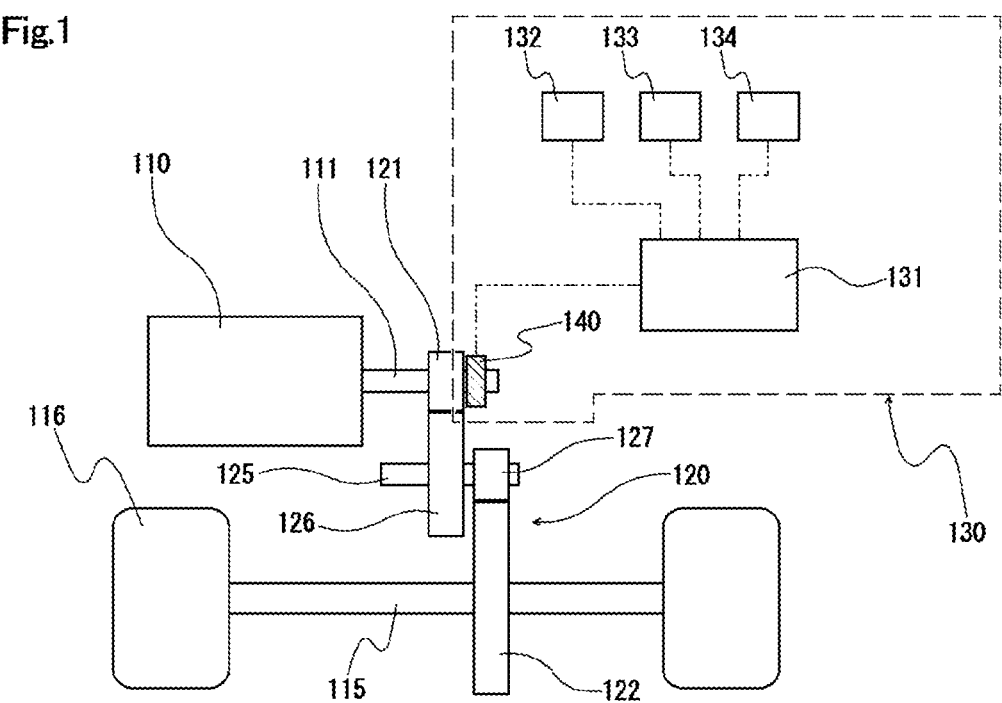
FIG. 1 is a schematic diagram illustrating one configuration example of a vehicle parking lock system according to the present invention.

The vehicle parking lock system includes an input shaft 111, an output shaft 115, and a parking lock mechanism 130, as shown in FIG. 1. Torque is input to the input shaft 111 from a drive source 110 mounted on the vehicle. The output shaft 115 outputs the torque input from the input shaft 111 via a transmission 120 to drive wheels 116 of the vehicle. The parking lock mechanism 130 is configured to be able to restrict the rotation of either the input shaft 111 or the output shaft 115.

The transmission 120 includes a first gear 121 provided to the input shaft 111, a second gear 122 provided to the output shaft 115 that extends parallel to the input shaft 111, a third gear 126 provided to an intermediate shaft 125 that extends parallel to the input shaft 111 and output shaft 115, and a fourth gear 127 provided to the intermediate shaft 125. The third gear 126 engages with the first gear 121, and the fourth gear 127 engages with the second gear 122.

The parking lock mechanism 130 includes a selectable clutch 140, a plurality of sensors mounted on the vehicle, and a control unit 131. In this embodiment, the selectable clutch 140 is provided to the input shaft 111.

The selectable clutch 140 may be any type of clutch such as, for example, a cam clutch that uses cams as engaging elements, a roller clutch that uses rollers as engaging elements, or a ratchet clutch that uses a ratchet mechanism for the engaging elements. In the following, one example of a cam clutch will be described as the selectable clutch 140.

Figure 2:
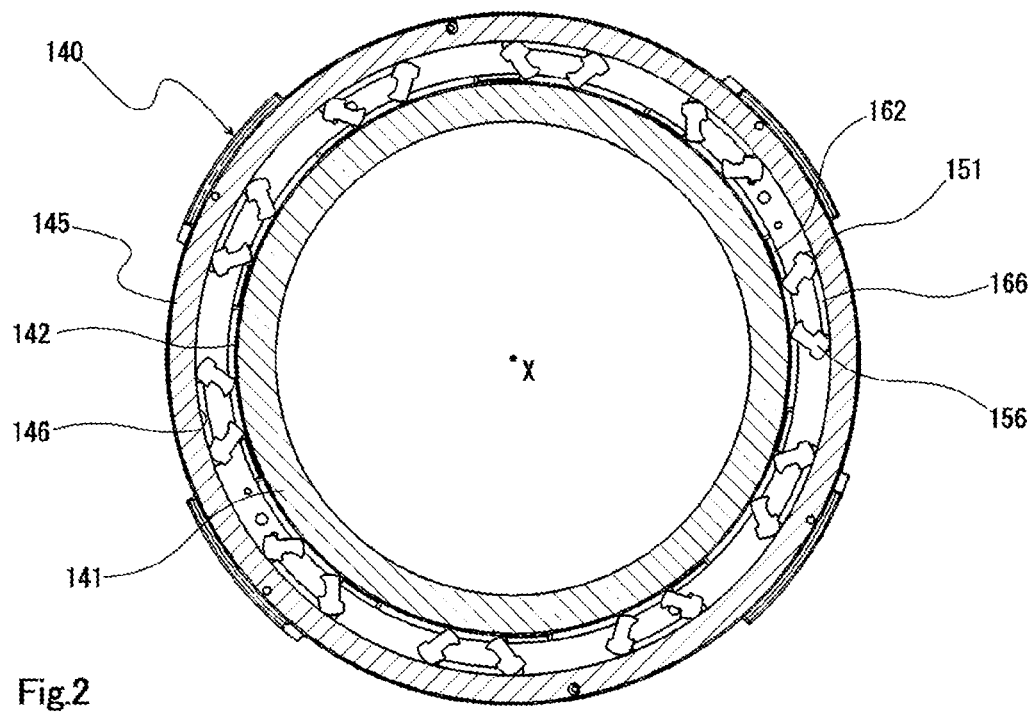
FIG. 2 is a schematic illustration of one configuration example of a selectable clutch in a cross section perpendicular to the rotation axis.
Figure 3:
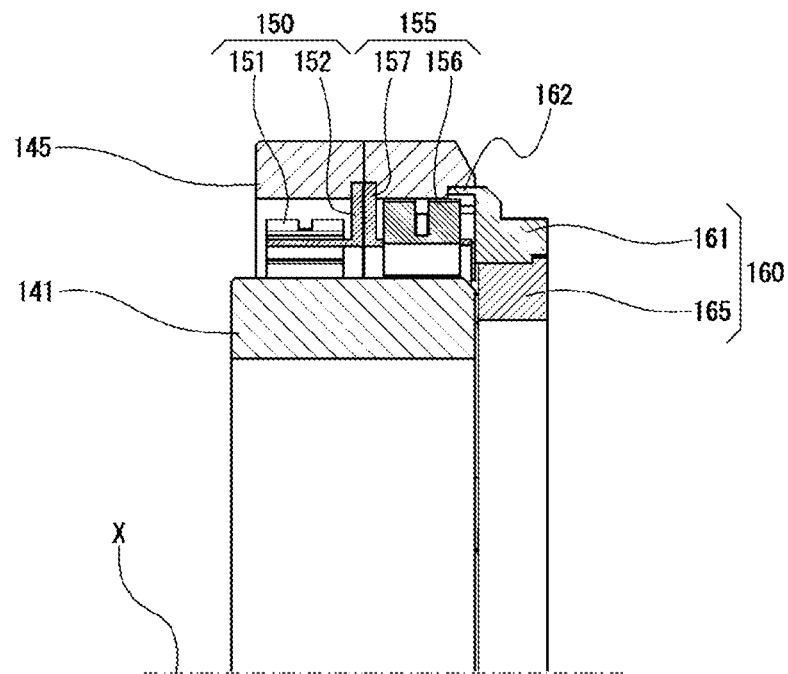
FIG. 3 is a partial enlargement of a cross-sectional view along the rotation axis of the selectable clutch shown in FIG. 2.
Figure 4:
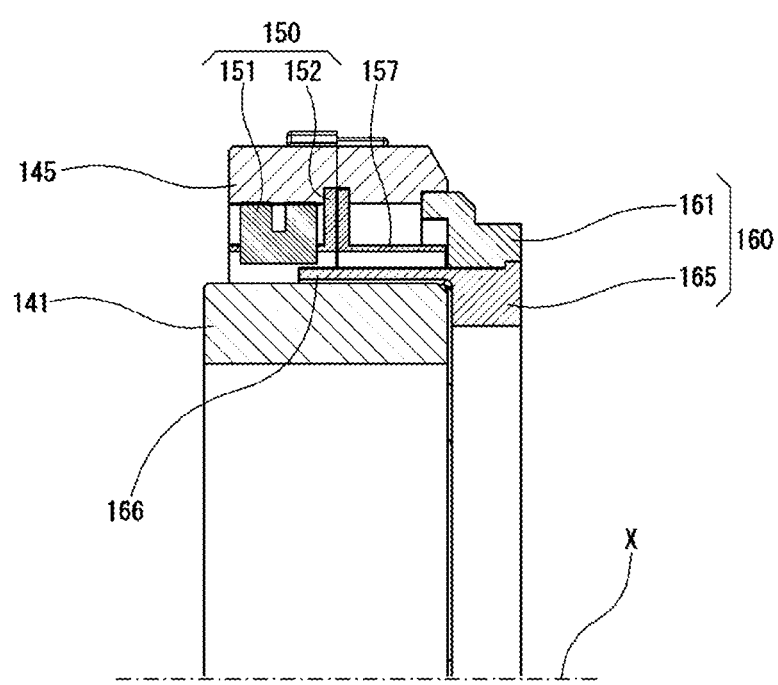
FIG. 4 is a cross-sectional view along the center axis of the selectable clutch shown in FIG. 2, illustrating a part of a cross section different from FIG. 3 to a larger scale.

The selectable clutch 140 includes, as shown in FIG. 2 to FIG. 4, an inner race 141 and an outer race 145 provided on the same axis X, a cam mechanism disposed in an annular space between an inner raceway 142 and an outer raceway 146, and an operating mode switch mechanism 160 that switches the operating modes of the selectable clutch 140. In this selectable clutch 140, the outer race 145 serves as a fixed race, and the inner race 141 serves as a rotating race that rotates relative to the outer race 145.

The cam mechanism includes a first cam mechanism 150 and a second cam mechanism 155 that are axially juxtaposed.

The first cam mechanism 150 is made up of a plurality of first cams 151, a first cage ring 152 fixed to the outer race 145 and holding the plurality of first cams 151 at circumferential intervals, and a biasing means (not shown) that biases each of the plurality of first cams 151 into contact with the inner race 141 and outer race 145.

The second cam mechanism 155 is made up of a plurality of second cams 156, a second cage ring 157 fixed to the outer race 145 and holding the plurality of second cams 156 at circumferential intervals, and a biasing means (not shown) that biases each of the plurality of second cams 156 into contact with the inner race 141 and outer race 145.

The first cams 151 and second cams 156 wedge against the inner race 141 and outer race 145 in different directions. In this embodiment, the first cams 151 reversed front to back are used as the second cams 156.

The first cams 151 are configured to wedge against the inner race 141 and outer race 145 when the inner race 141 is rotated in the forward direction (counterclockwise in FIG. 2). The second cams 156 on the other hand are configured to wedge against the inner race 141 and outer race 145 when the inner race 141 is rotated in the reverse direction (clockwise in FIG. 2).

The operating mode switch mechanism 160 according to this embodiment includes a first selector 161 configured to be able to forcibly tilt each of the first cams 151, and a second selector 165 configured to be able to forcibly tilt each of the second cams 156.

The first selector 161 and second selector 165 are disposed on one axial side on the axis X coaxially with the inner race 141 and outer race 145, such as to be rotatable independently of the rotation of the inner race 141 and outer race 145.

The first selector 161 includes first cam orientation changing parts 162 each corresponding to each of the plurality of first cams 151. The first cam orientation changing parts 162 are configured to press a portion on the inner race side of the first cams 151 in the circumferential direction when the first selector 161 is rotated. The second selector 165 includes second cam orientation changing parts 166 each corresponding to each of the plurality of second cams 156. The second cam orientation changing parts 166 are configured to press a portion on the outer race side of the second cams 156 when the second selector 165 is rotated.

This selectable clutch 140 is configured to be switchable between four operating modes including: a two-way lock mode that prohibits rotation of the inner race 141 relative to the outer race 145 in both forward and reverse directions; a forward lock mode that prohibits rotation of the inner race 141 relative to the outer race 145 in the forward direction; a reverse lock mode that prohibits rotation of the inner race 141 relative to the outer race 145 in the reverse direction; and a two-way free mode that allows rotation of the inner race 141 relative to the outer race 145 in both forward and reverse directions.

Figure 5A:
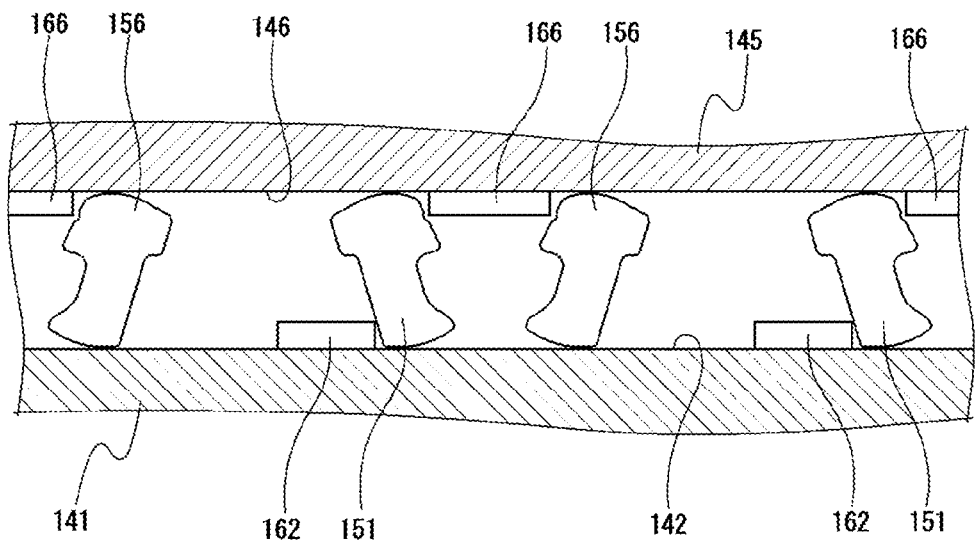
FIG. 5A is a diagrammatic view of the selectable clutch shown in FIG. 2 illustrating a state in which the operating mode is a two-way lock mode.

First, FIG. 5A shows the first cams 151 and second cams 156 maintained in a standby state where they can immediately start wedging against the inner race 141 and outer race 145 upon application of torque on the inner race 141, with the first selector 161 and second selector 165 each fixed in a first fixed position. The operating mode of the selectable clutch 140 is therefore the two-way lock mode that prohibits rotation of the inner race 141 relative to the outer race 145 in both forward and reverse directions.

Figure 5B:
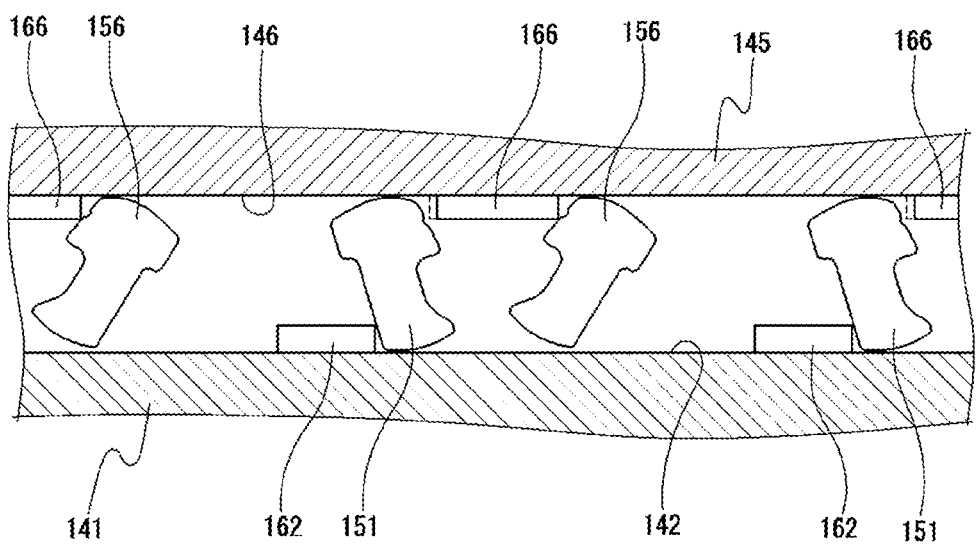
FIG. 5B is a diagrammatic view of the selectable clutch shown in FIG. 2 illustrating a state in which the operating mode is a forward lock mode.

As shown in FIG. 5B, when the second selector 165 alone is rotated in the reverse direction (rightward in FIG. 5B) by a suitable drive source, the second cam orientation changing parts 166 press the second cams 156 in the circumferential direction so that the second cams 156 tilt to separate from the inner raceway 142. Meanwhile, the first cams 151 are maintained in the standby state waiting to engage. Thus the operating mode of the selectable clutch 140 is switched to the forward lock mode that prohibits rotation of the inner race 141 relative to the outer race 145 in the forward direction.

Figure 5C:
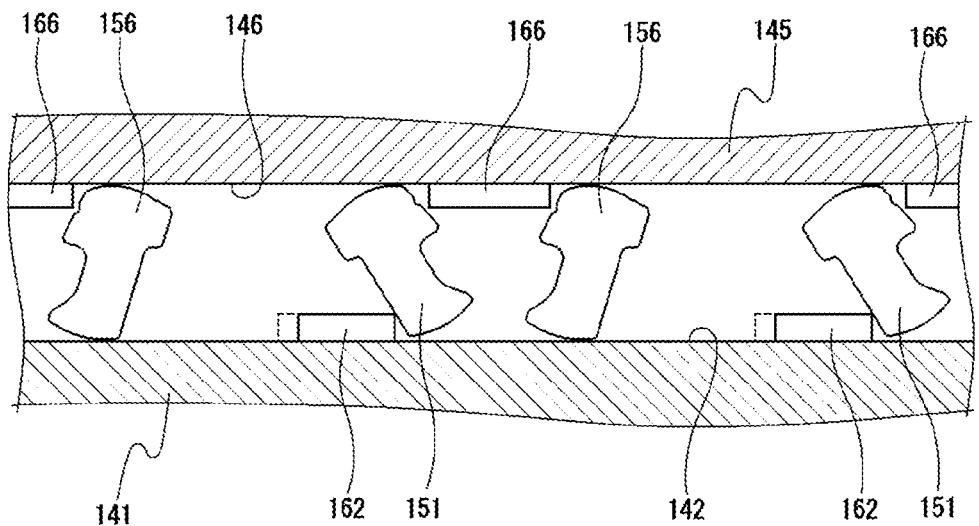
FIG. 5C is a diagrammatic view of the selectable clutch shown in FIG. 2 illustrating a state in which the operating mode is a reverse lock mode.

When the first selector 161 alone is rotated in the reverse direction as shown in FIG. 5C (rightward in FIG. 5C) by a suitable drive source, the first cam orientation changing parts 162 press the first cams 151 in the circumferential direction so that the first cams 151 tilt to separate from the inner raceway 142. Meanwhile, the second cams 156 are maintained in the standby state waiting to engage. Thus the operating mode of the selectable clutch 140 is switched to the reverse lock mode that prohibits rotation of the inner race 141 relative to the outer race 145 in the reverse direction.

Figure 5D:
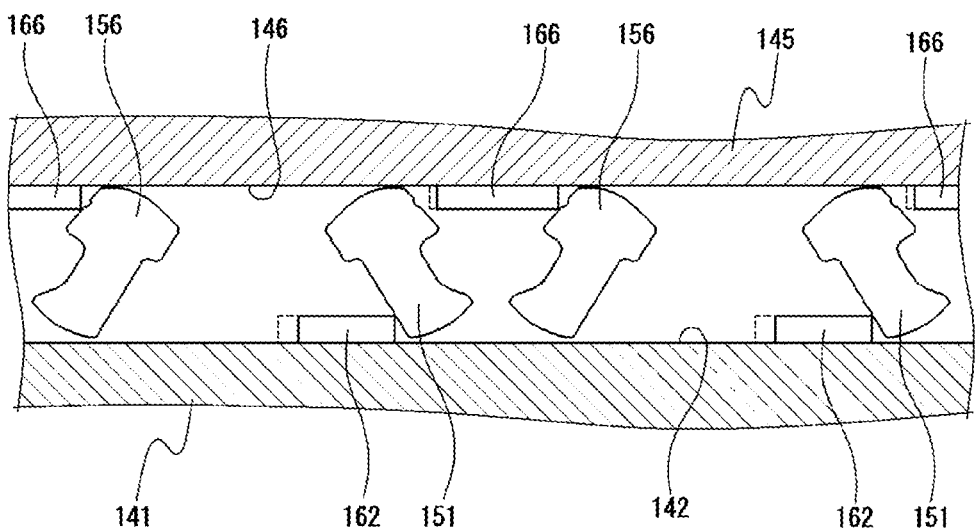
FIG. 5D is a diagrammatic view of the selectable clutch shown in FIG. 2 illustrating a state in which the operating mode is a two-way free mode.

When the first selector 161 and second selector 165 are both rotated in the reverse direction as shown in FIG. 5D (rightward in FIG. 5D) by a suitable drive source, the first cams 151 and second cams 156 are respectively pressed in the circumferential direction by the first and second cam orientation changing parts 162 and 166 and tilted to separate from the inner raceway 142. Thus the operating mode of the selectable clutch 140 is switched to the two-way free mode that allows rotation of the inner race 141 relative to the outer race 145 in both forward and reverse directions.

The plurality of sensors that configure the parking lock mechanism 130 include a first sensor 132, a second sensor 133, and a third sensor 134 as shown in FIG. 1. The first sensor 132 detects whether or not the vehicle is in a drivable state, when the vehicle is stationary. The second sensor 133 detects whether or not the vehicle continues to be stationary. The third sensor 134 detects the inclination of the vehicle.

The first sensor 132 may be for example a position sensor that detects the position of a shift lever in operation.

The second sensor 133 may be a sensor that determines the movement of the vehicle. Specifically, the second sensor 133 may be a sensor that detects the brake pedal depression time and/or accelerator pedal depression time when the vehicle is stationary (when the vehicle speed is 0 km/h). The second sensor 133 may also be a vehicle speed sensor.

The third sensor 134 may be for example a slope sensor, an inclination angle sensor, or any sensor that detects the slope of a road surface.

Figure 6:
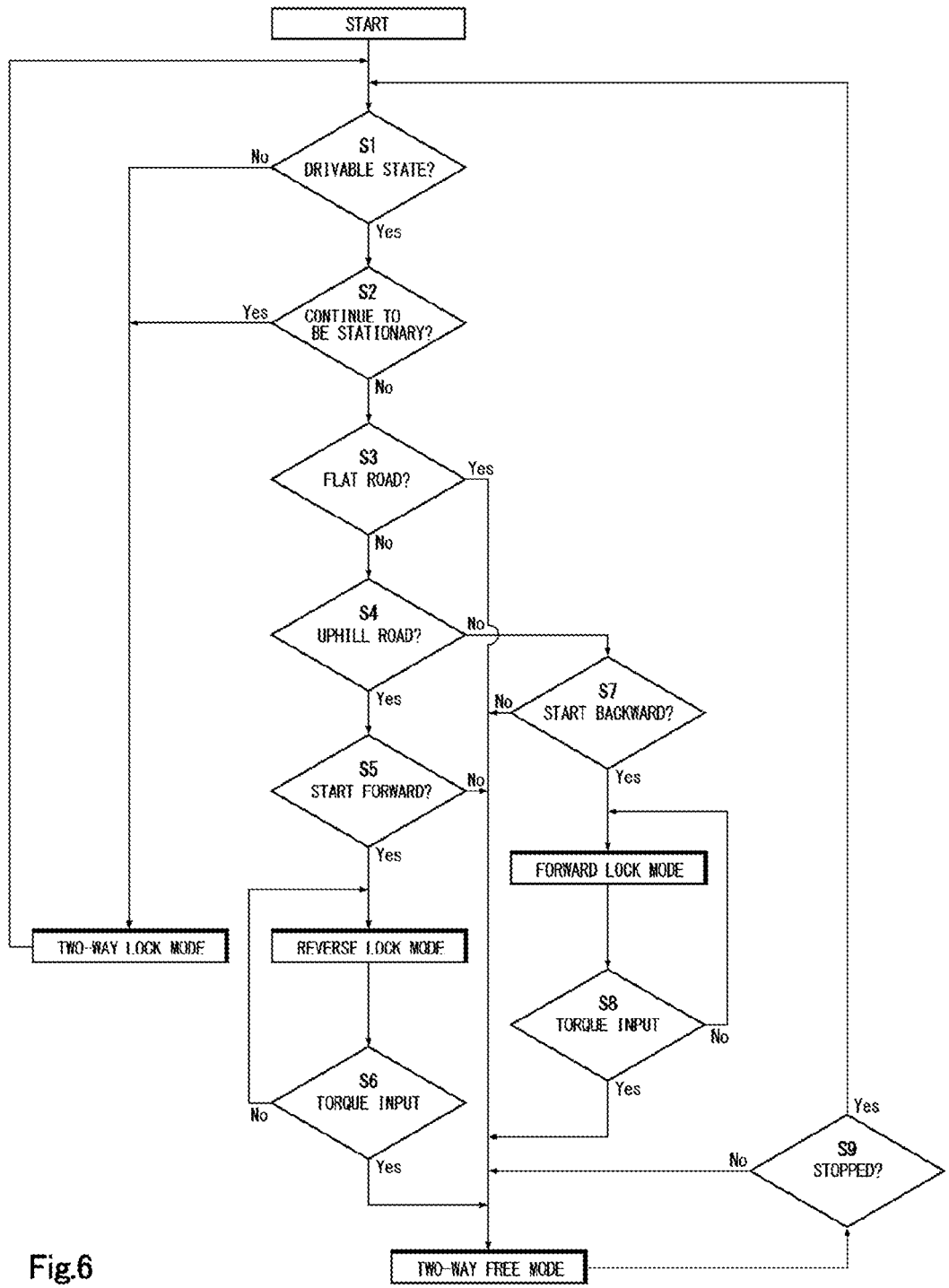
FIG. 6 is an operation flowchart of the vehicle parking lock system.

The control unit 131 that configures the parking lock mechanism 130 controls the operating modes of the selectable clutch 140 based on the detection signals of the plurality of sensors to prevent an unintended movement of the vehicle when the vehicle is stationary. The parking lock control procedure of the control unit 131 is described below with reference to FIG. 6.

Step 1

First, a determination step S1 is performed in a state in which the vehicle is stationary (when the vehicle speed is 0 km/h) to determine whether or not the vehicle is in a drivable state. In this determination step S1, the first sensor 132 detects the position of the shift lever in operation. When the shift lever is positioned in the P range or N range, the control unit 131 determines that the vehicle is not in a drivable state, and sets the operating mode of the selectable clutch 140 to the two-way lock mode. When the shift lever is positioned in the D range or R range, the control unit 131 determines that the vehicle is in a drivable state, and carries out a determination step S2 for determining whether or not the vehicle continues to be stationary.

Step 2

At the determination step S2, when the vehicle is stationary in a drivable state, it is determined whether or not the driver intends to move the vehicle, based on the detection signals of the second sensor 133. For example, when the second sensor 133 detects that the brake pedal is depressed for more than a certain time, the control unit 131 determines that the driver has no intention of moving the vehicle, and sets the operating mode of the selectable clutch 140 to the two-way lock mode. On the other hand, when the second sensor 133 detects that the accelerator pedal is depressed (torque is input), the control unit 131 determines that the driver has an intension of moving the vehicle, and carries out a determination step S3 of determining whether the vehicle is parked on a flat road or sloped road.

In this determination step S2, the control unit may determine whether or not the driver has an intention of moving the vehicle based on the detection signals of the vehicle speed sensor that may be part of the second sensor 133. That is, when it is detected that the vehicle has been stationary for a certain time or more, the control unit may determine that the driver has no intention of moving the vehicle, and when the vehicle has been maintained stationary for less than a certain time, the control unit may determine that the driver has an intention of moving the vehicle.

The brake pedal depression time or accelerator pedal depression time, and the time in which the vehicle is maintained stationary, can be determined based on a preset reference time, which can be set suitably in accordance with the purpose, within the range of, for example, 3 seconds or less.

Step 3

In the determination step S3, the inclination of the vehicle is detected by the third sensor 134 when the vehicle in a drivable state is about to be moved. When the inclination of the vehicle is less than a certain value, the control unit 131 determines that the vehicle is parked on a flat road, and sets the operating mode of the selectable clutch 140 to the two-way free mode. On the other hand, when the inclination of the vehicle is equal to or more than the certain value, the control unit 131 determines that the vehicle is parked on a sloped road, and carries out a determination step S4 for determining whether or not the slope is uphill. The inclination of the vehicle may be determined based on a suitable reference in accordance with the purpose, which may be, for example, 1.5% slope.

Step 4

When the control unit 131 determines that vehicle is parked on an uphill road based on the detection signals from the third sensor 134 in the determination step S4, the control unit 131 carries out a determination step S5 for determining whether or not the vehicle is to be moved forward. On the other hand, when the control unit 131 determines that the vehicle is parked on a downhill road based on the detection signals from the third sensor 134, the control unit 131 carries out a determination step S7 for determining whether or not the vehicle is to be moved backward.

Step 5

In the determination step S5, the moving direction of the vehicle is determined based on the position of the shift lever in operation detected by the first sensor 132 in Step 1. When the shift lever is positioned in the D range, the control unit 131 determines that the vehicle is to be moved forward, and sets the operating mode of the selectable clutch 140 to a one-way lock mode that prohibits rotation of the output shaft in the backward direction, i.e., to the reverse lock mode. On the other hand, when the shift lever is positioned in the R range, the control unit 131 determines that the vehicle is to be moved backward, and sets the operating mode of the selectable clutch 140 to the two-way free mode.

Step 6

With the operating mode of the selectable clutch 140 set to the reverse lock mode, when the vehicle is started to move forward, the control unit 131 carries out a determination step S6 for determining whether or not the operating mode of the selectable clutch 140 is to be switched, based on the accelerator pedal depression time and the speed of the vehicle. Namely, when the accelerator pedal is being depressed (torque is being input), and when the vehicle speed has reached a certain level or more, the control unit 131 determines that the vehicle is now in a stable driving condition, and sets the operating mode of the selectable clutch 140 to the two-way free mode.

Step 7

When it is determined that the vehicle is parked on a downhill road in the determination step S4, the moving direction of the vehicle is determined in the determination step S7, based on the position of the shift lever in operation detected by the first sensor 132 in Step 1. When the shift lever is positioned in the R range, the control unit 131 determines that the driver is going to start the vehicle backward, and sets the operating mode of the selectable clutch 140 to the forward lock mode that prohibits rotation of the output shaft in the forward direction. On the other hand, when the shift lever is positioned in the D range, the control unit 131 determines that the driver is going to start the vehicle forward, and sets the operating mode of the selectable clutch 140 to the two-way free mode.

Step 8

With the operating mode of the selectable clutch 140 set to the forward lock mode, when the vehicle is started to move backward, the control unit 131 carries out a determination step S8 for determining whether or not the operating mode of the selectable clutch 140 is to be switched, based on the accelerator pedal depression time and the speed of the vehicle. Namely, when the accelerator pedal is being depressed (torque is being input) for more than a certain time, and when the vehicle speed has reached a certain level or more, the control unit 131 determines that the vehicle is now in a stable driving condition, and sets the operating mode of the selectable clutch 140 to the two-way free mode. The accelerator pedal depression time can be determined based on a preset reference time, which can be set suitably in accordance with the purpose, within the range of, for example, 3 seconds or less. The reference speed based on which the vehicle speed is determined may be set within the range of, for example, 4 km/h or less.

Step 9

When the vehicle is driving, the control unit 131 monitors the vehicle speed based on the detection signals from the second sensor 133, and repeatedly carries out a determination step S9 for determining whether or not the vehicle is stationary. When the second sensor 133 detects that the vehicle speed has become 0 km/h, the control unit 131 determines that the vehicle has come to a stop, repeats the procedure from Step 1 to Step 8 described above, and sets the operating mode of the selectable clutch 140 accordingly.

The selectable clutch 140 of the vehicle parking lock system described above uses cams as engaging elements, and can be switched to four operating modes. This reduces or eliminates backlash, and minimizes the freewheeling of the output shaft 115 that occurs before it is locked. The operating modes of the selectable clutch 140 are switched based on the detection signals of the sensors, which allows for fine control of the parking lock, and enables a smooth start for the stopped vehicle. This realizes a parking lock with a positive user perception, without complex control, and with a simple configuration. The elimination or reduction of the impact caused by applying the lock while the vehicle is in motion allows for a decrease in the required design strength, leading to cost reduction.

Moreover, this system requires no power to maintain the brake, and can avoid motor overheating and reduce power consumption.

While one embodiment of the present invention has been described in detail, the present invention is not limited to the above-described embodiment and may be carried out with various design changes without departing from the scope of the present invention set forth in the claims.

Figure 7:
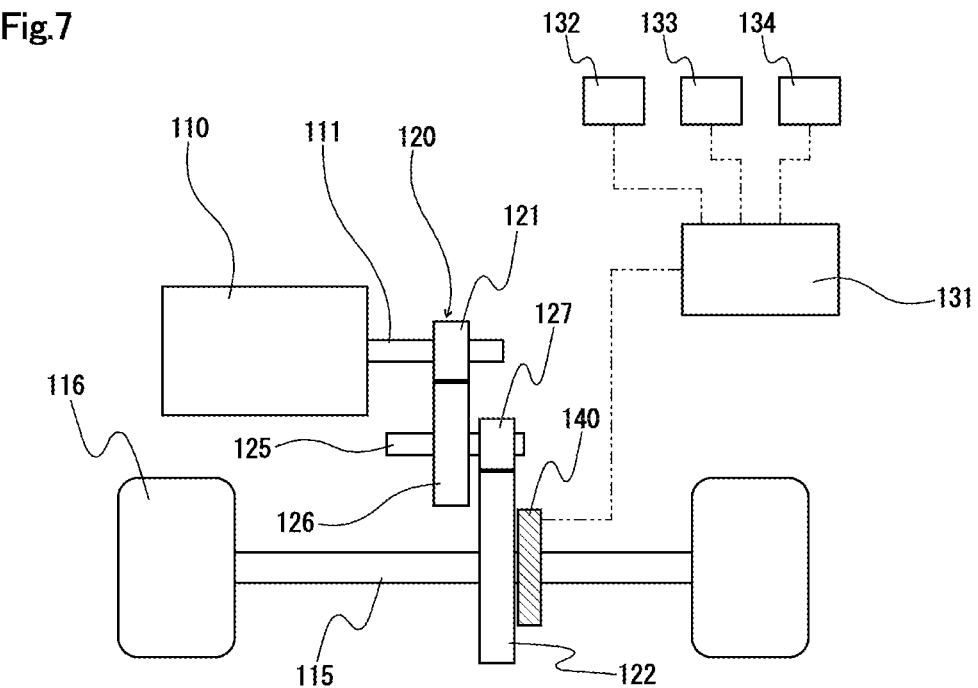
FIG. 7 is a schematic diagram illustrating another configuration example of the vehicle parking lock system according to the present invention.
Figure 8:
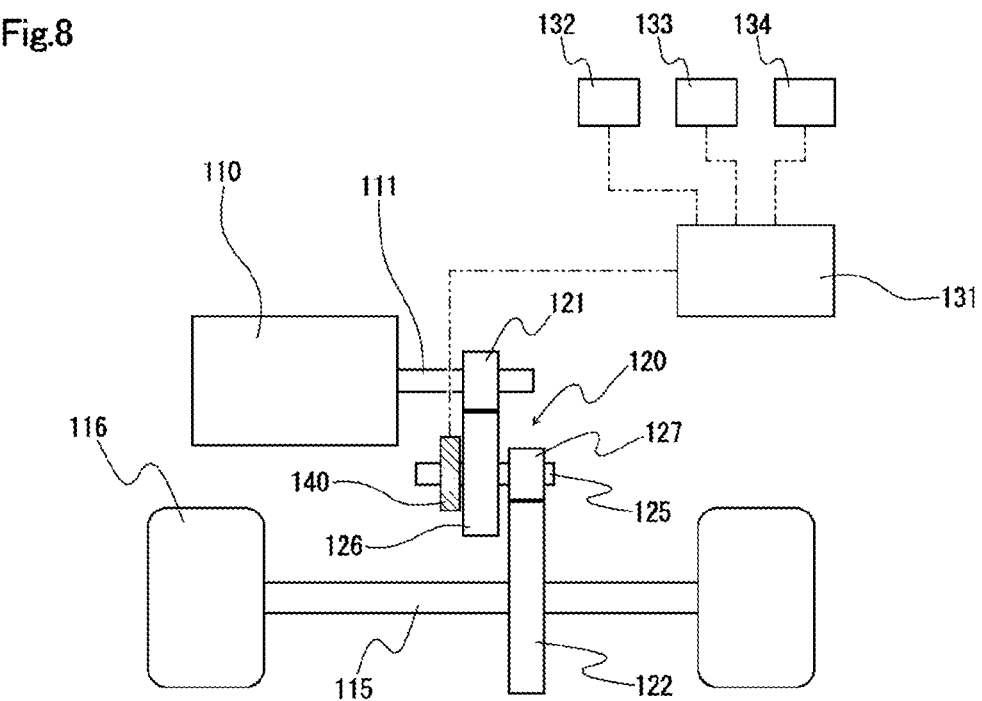
FIG. 8 is a schematic diagram illustrating yet another configuration example of the vehicle parking lock system according to the present invention.

For example, the selectable clutch 140 may be provided to any rotating shaft. While the vehicle parking lock system described in the above embodiment has the selectable clutch provided to the input shaft, the selectable clutch 140 may be provided to the output shaft 115 as shown in FIG. 7, or the selectable clutch 140 may be provided to the intermediate shaft 125 in the transmission 120 as shown in FIG. 8.

Figure 9:
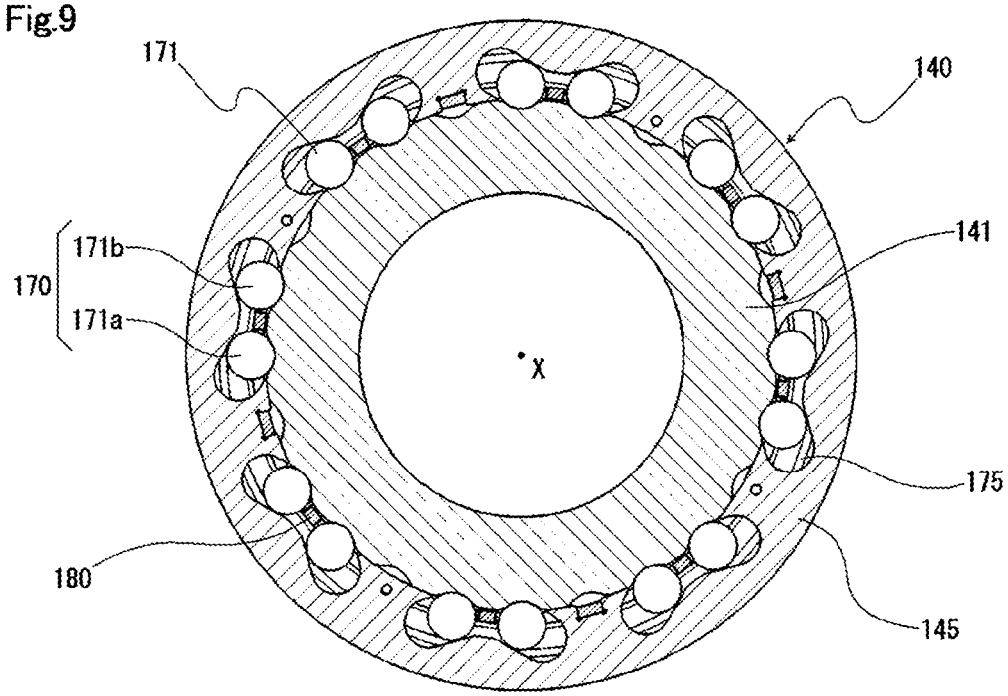
FIG. 9 illustrates another configuration example of the selectable clutch in a cross section perpendicular to the rotation axis.

While the vehicle parking lock system described in the above embodiment is equipped with a selectable clutch that uses cams as engaging elements, the selectable clutch may use rollers, or a ratchet mechanism, as engaging elements, as long as the clutch is configured switchable between four operating modes. FIG. 9 shows one configuration example of a ratchet type (mechanical) selectable clutch that has rollers as engaging elements.

This selectable clutch 140 includes an inner race 141 and an outer race 145 that are arranged on the same axis X, a plurality of cylindrical rollers 171 disposed between the inner race 141 and the outer race 145, a biasing means 175 that biases each of the plurality of rollers 171 in a radial direction, and a selector 180 for switching the operating modes of the selectable clutch 140.

Figure 10:
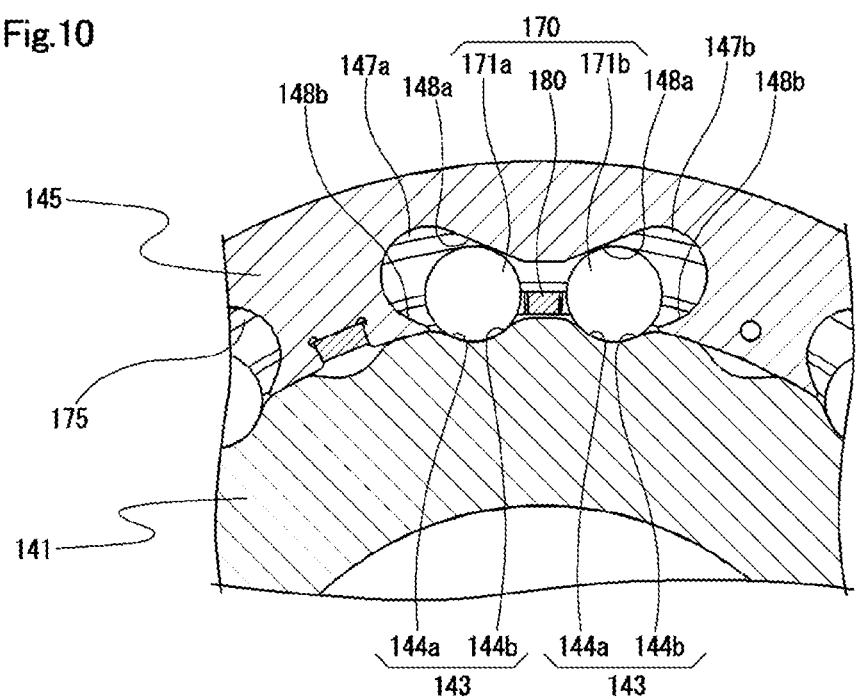
FIG. 10 is a schematic view illustrating a part of the selectable clutch shown in FIG. 9 to a larger scale.

On the outer circumferential surface of the inner race 141 that is the rotating race are formed roller support parts 143 that support the rollers 171 at predetermined circumferential intervals as shown also in FIG. 10. The roller support part 143 is a recessed groove extending in the direction of the rotation axis. Each roller support part 143 includes a first inclined surface 144a that forms a side wall on the circumferentially forward side, and a second inclined surface 144b that forms a side wall on the circumferentially reverse side. The opening edge of the roller support part 143 is chamfered, for example, as viewed in cross section, which can help facilitate the rolling of the rollers 171 and reduce the ratchet noise.

In this selectable clutch 140, two rollers 171, each held in each of two adjacent roller support parts 143, make a pair. A plurality of roller pairs 170 are arranged at predetermined circumferential intervals. Hereinafter, one of the pair of rollers 170 located on the side in the forward direction (counterclockwise in FIG. 10) will be referred to as the first roller 171a, and the roller on the side in the reverse direction (clockwise in FIG. 10) as the second roller 171b. Unless otherwise specified, henceforth the term "roller 171" refers to the first roller 171a and the second roller 171b.

On the inner circumferential surface of the outer race 145 are formed: a first pocket part 147a corresponding to the first roller 171a, extending obliquely toward the circumferentially forward direction and radially outward; and a second pocket part 147b corresponding to the second roller 171b, extending obliquely toward the circumferentially reverse direction and radially outward.

The first pocket parts 147a and second pocket parts 147b are configured to be able to accommodate one roller 171 each inside to allow the rollers 171 to separate from the inner race 141. The first and second pocket parts 147a and 147b each include a third inclined surface 148a located on the radially outer side and a fourth inclined surface 148b located on the radially inner side.

The selector 180 is configured such as to be axially movable independently of the rotation of the inner race 141 and outer race 145.

Figure 11:
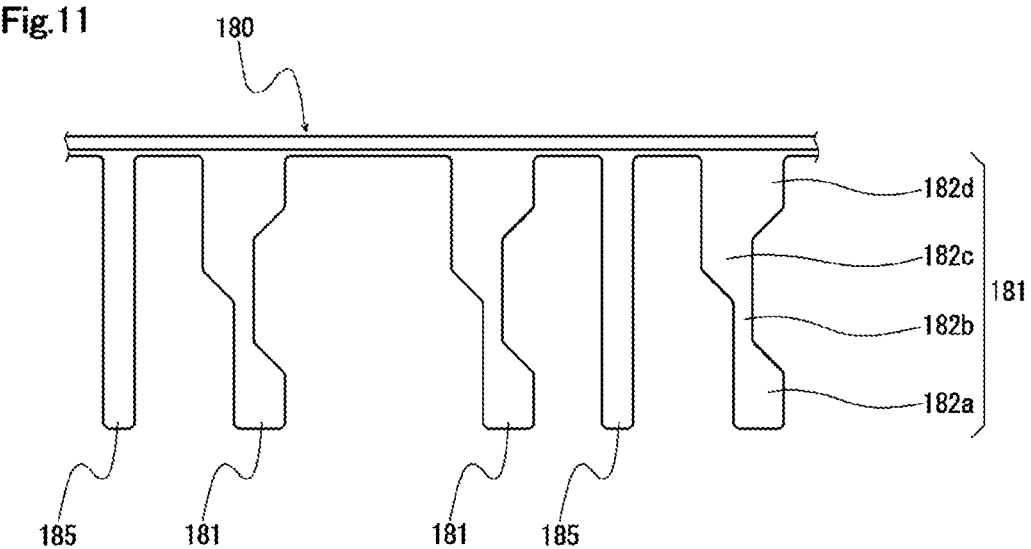
FIG. 11 is a schematic developed view illustrating the configuration of a selector in the selectable clutch shown in FIG. 9.

As shown in FIG. 11, the selector 180 includes a plurality of roller position changing parts 181 that axially extend and correspond to each of the plurality of roller pairs 170. Reference numeral 185 denotes a guide portion provided for ensuring stable axial movement of the selector 180.

The roller position changing parts 181 each include: a first pressing part 182a provided at one axial end and configured to press only the second roller 171b in the circumferential direction; a neutral portion 182b continuous with the other end of the first pressing part 182a and configured to be out of contact with both of the first roller 171a and second roller 171b; a second pressing part 182c continuous with the other end of the neutral portion 182b and configured to press only the first roller 171a in the circumferential direction; and a third pressing part 182d continuous with the other end of the second pressing part 182c and configured to press the first roller 171a and the second roller 171b away from each other in the circumferential direction.

Figure 12A:
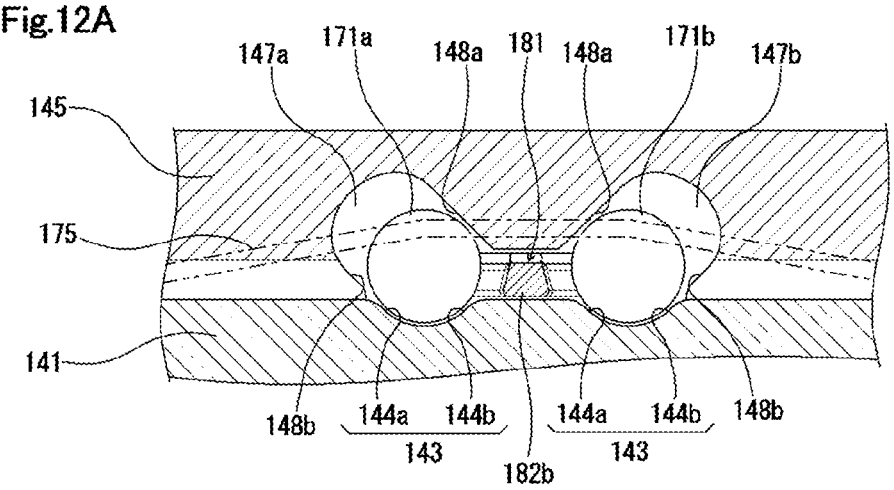
FIG. 12A is a diagrammatic view of the selectable clutch shown in FIG. 9 illustrating a state in which the operating mode is a two-way lock mode.

In this selectable clutch 140, as shown in FIG. 12A, when the selector 180 is fixed at a first fixed position in the axial direction, where the neutral portion 182b of each roller position changing part 181 is located between the first roller 171a and the second roller 171b, the first rollers 171a and second rollers 171b are maintained in a standby state where they can immediately start wedging against the inner race 141 and outer race 145 upon application of torque on the inner race 141. Namely, the operating mode of the selectable clutch 140 in this state is the two-way lock mode that prohibits rotation of the inner race 141 relative to the outer race 145 in both forward and reverse directions.

In the two-way lock mode, when the inner race 141 is rotated in the forward direction (leftward in FIG. 12A), the second roller 171b is held between the second inclined surface 144b of the roller support part 143 that supports the second roller 171b, and the third inclined surface 148a of the second pocket part 147b, in the circumferential direction. Thus the inner race 141 engages with the outer race 145. On the other hand, when the inner race 141 is rotated in the reverse direction (rightward in FIG. 12A), the first roller 171a is held between the first inclined surface 144a of the roller support part 143 that supports the first roller 171a, and the third inclined surface 148a of the first pocket part 147a, in the circumferential direction. Thus the inner race 141 engages with the outer race 145.

Figure 12B:
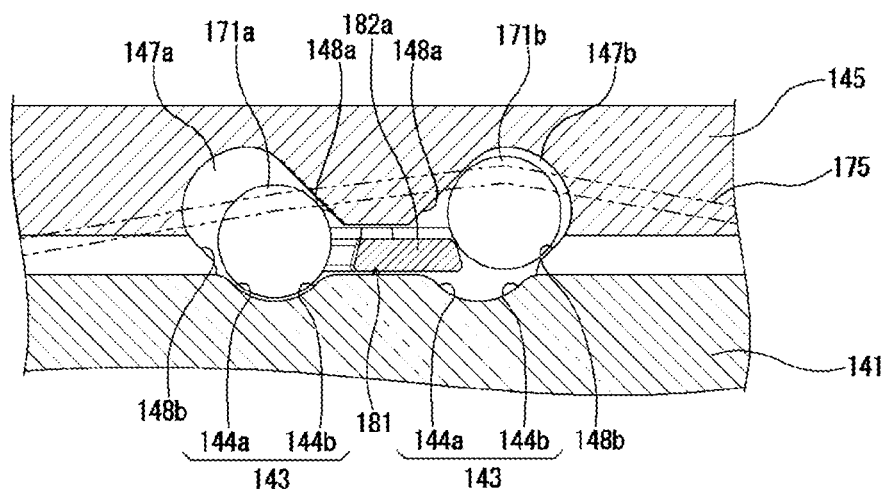
FIG. 12B is a diagrammatic view of the selectable clutch shown in FIG. 9 illustrating a state in which the operating mode is a reverse lock mode.

When the selector 180 is axially moved rearward (away from the viewer perpendicularly to the paper plane in FIG. 12B) and fixed in a second fixed position, the second rollers 171b move into the second pocket parts 147b by the action of the first pressing parts 182a of the roller position changing parts 181 against the biasing force of the biasing means 175, so that the second rollers 171b are separated from the inner race 141, as shown in FIG. 12B. In this state, when the inner race 141 is rotated in the reverse direction, the inner race 141 and outer race 145 engage. The operating mode of the selectable clutch 140 is thus switched to the reverse lock mode that prohibits rotation of the inner race 141 relative to the outer race 145 in the reverse direction.

Figure 12C:
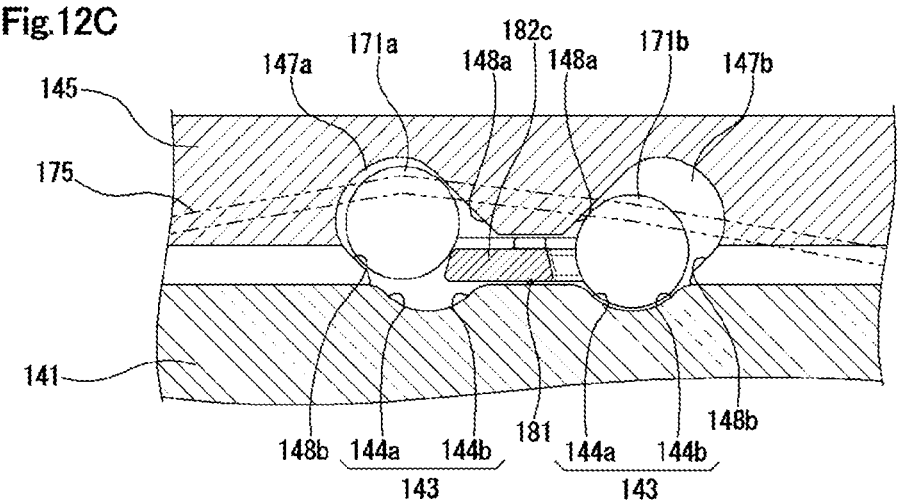
FIG. 12C is a diagrammatic view of the selectable clutch shown in FIG. 9 illustrating a state in which the operating mode is a forward lock mode.

On the other hand, when the selector 180 is axially moved forward (toward the viewer perpendicularly to the paper plane in FIG. 12C) from the first fixed position and fixed in a third fixed position, the first rollers 171a move into the first pocket parts 147a by the action of the second pressing parts 182c of the roller position changing parts 181 against the biasing force of the biasing means 175, so that the first rollers 171a are separated from the inner race 141, as shown in FIG. 12C. In this state, when the inner race 141 is rotated in the forward direction, the inner race 141 and outer race 145 engage. The operating mode of the selectable clutch 140 is thus switched to the forward lock mode that prohibits rotation of the inner race 141 relative to the outer race 145 in the forward direction.

Figure 12D:
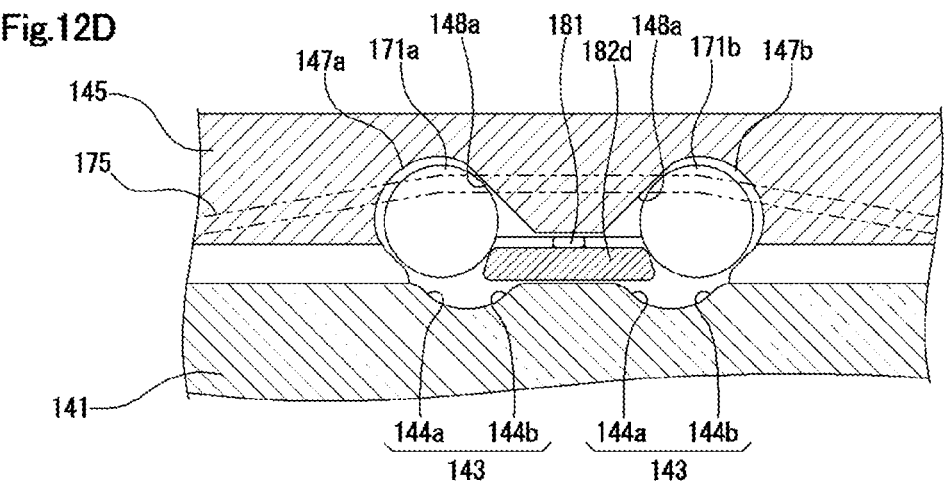
FIG. 12D is a diagrammatic view of the selectable clutch shown in FIG. 9 illustrating a state in which the operating mode is a two-way free mode.

Further, when the selector 180 is axially moved forward (toward the viewer perpendicularly to the paper plane in FIG. 12D) from the third fixed position and fixed in a fourth fixed position, the first rollers 171a move into the first pocket parts 147a while the second rollers 171b move into the second pocket parts 147b by the action of the third pressing parts 182d of the roller position changing parts 181 against the biasing force of the biasing means 175, so that the first rollers 171a and second rollers 171b are both separated from the inner race 141, as shown in FIG. 12D. In this state, when the inner race 141 is rotated, whether in the forward direction or reverse direction, the inner race 141 freewheels. The operating mode of the selectable clutch 140 is thus switched to the two-way free mode that allows rotation of the inner race 141 relative to the outer race 145 in both forward and reverse directions.

The selectable clutch 140 described above locks the inner race 141 to the outer race 145 by holding the first rollers 171a and second rollers 171b between two inclined surfaces in the circumferential direction. Stable engagement is thus achieved with a simple structure, which allows for a size reduction. Moreover, the surface pressure applied to the inclined surfaces and rollers 171 when locked can be set low, allowing the clutch to be designed with an inexpensive material that is more resistant to chipping, which may be caused by impact, or wear. Since the rollers 171 rotate themselves and substantially do not engage at the same point, the durability of the clutch can be improved and its service life can be extended.

While the selectable clutch described above uses the inner race as the rotating race and the outer race as the fixed race, the selectable clutch may be configured to use the inner race as the fixed race and the outer race as the rotating race.

The selector of the selectable cam clutch described above is configured to be circumferentially movable. Instead, the selector may be configured to be axially movable. Similarly, the selector of the selectable roller clutch may be configured to be circumferentially movable.

What is claimed is:

1. A vehicle parking lock system comprising:
   an input shaft to which a torque is input from a drive source mounted on a vehicle;
   an output shaft outputting the torque input from the input shaft via a transmission to a drive wheel of the vehicle; and
   a parking lock mechanism adapted to restrict either a rotation of the input shaft or a rotation of the output shaft,
   the parking lock mechanism including a selectable clutch provided to one of the input shaft, the output shaft, and an intermediate shaft in the transmission, a plurality of sensors mounted on the vehicle, and a control unit,
   the selectable clutch including a fixed race and a rotating race that are arranged coaxially, and being configured to be switchable between four operating modes including:
   a two-way lock mode prohibiting rotation of the rotating race relative to the fixed race in both forward and reverse directions;
   a forward lock mode prohibiting rotation of the rotating race relative to the fixed race in the forward direction;
   a reverse lock mode prohibiting rotation of the rotating race relative to the fixed race in the reverse direction; and
   a two-way free mode allowing rotation of the rotating race relative to the fixed race in both forward and reverse directions,
   the plurality of sensors including:
   a first sensor that detects whether or not the vehicle is in a drivable state, when the vehicle is stationary;
   a second sensor that detects whether or not the vehicle continues to be stationary; and
   a third sensor that detects an inclination of the vehicle,
   the control unit being adapted to control the operating modes of the selectable clutch based on detection signals of the plurality of sensors to prevent an unintended movement of the vehicle when the vehicle is stationary.

2. The vehicle parking lock system according to claim 1, wherein the control unit sets the operating mode of the selectable clutch to the two-way lock mode when the control unit determines that the vehicle is not in a drivable state based on the detection signal of the first sensor when the vehicle is stationary.

3. The vehicle parking lock system according to claim 1, wherein the control unit sets the operating mode of the selectable clutch to the two-way lock mode when the control unit determines that the vehicle continues to be stationary based on the detection signal of the second sensor when the vehicle is stationary in a drivable state.

4. The vehicle parking lock system according to claim 1, wherein the control unit sets the operating mode of the selectable clutch to the two-way free mode when the control unit determines that the vehicle is parked on a flat road based on the detection signal of the third sensor when the vehicle in a drivable state is about to be moved.

5. The vehicle parking lock system according to claim 1, wherein, when the control unit determines that the vehicle is parked on an uphill road based on the detection signal of the third sensor when the vehicle in a drivable state is about to be moved, the control unit sets the operating mode of the selectable clutch to the reverse lock mode when the vehicle is started to move forward, and sets the operating mode of the selectable clutch to the two-way free mode when the vehicle is started to move backward.

6. The vehicle parking lock system according to claim 1, wherein, when the control unit determines that the vehicle is parked on a downhill road based on the detection signal of the third sensor when the vehicle in a drivable state is about to be moved, the control unit sets the operating mode of the selectable clutch to the two-way free mode when the vehicle is started to move forward, and sets the operating mode of the selectable clutch to the forward lock mode when the vehicle is started to move backward.

7. The vehicle parking lock system according to claim 1, wherein the control unit sets the operating mode of the selectable clutch to the two-way free mode when the control unit determines that an accelerator pedal depression time is more than a certain time when the vehicle that is stationary is to be moved.

8. The vehicle parking lock system according to claim 1, wherein the selectable clutch is one of a cam clutch that uses cams as engaging elements disposed between the fixed race and the rotating race, and a ratchet-type clutch that uses rollers as the engaging elements and utilizes wedging of the rollers.

* * * * *